(12) United States Patent
Sayko et al.

(10) Patent No.: US 10,554,778 B2
(45) Date of Patent: Feb. 4, 2020

(54) SYSTEM AND METHOD FOR PROVIDING AN ADJUNCT DEVICE IN A CONTENT DISTRIBUTION NETWORK

(71) Applicant: AT&T Intellectual Property I, L.P., Atlanta, GA (US)

(72) Inventors: Robert J. Sayko, Colts Neck, NJ (US); Gregory J. Smith, Shrewsbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/260,277

(22) Filed: Jan. 29, 2019

(65) Prior Publication Data

US 2019/0158619 A1    May 23, 2019

Related U.S. Application Data

(63) Continuation of application No. 15/724,964, filed on Oct. 4, 2017, now Pat. No. 10,230,811, which is a
(Continued)

(51) Int. Cl.
*G06F 15/16*     (2006.01)
*H04L 29/08*    (2006.01)
*H04N 21/222*   (2011.01)
*H04N 21/2343*  (2011.01)
*H04N 21/239*   (2011.01)
*H04N 21/61*    (2011.01)
*H04L 12/801*   (2013.01)

(52) U.S. Cl.
CPC .......... *H04L 67/2842* (2013.01); *H04L 47/10* (2013.01); *H04L 67/10* (2013.01); *H04L 67/1097* (2013.01); *H04N 21/222* (2013.01); *H04N 21/2343* (2013.01); *H04N 21/2393* (2013.01); *H04N 21/6125* (2013.01)

(58) Field of Classification Search
CPC ..... H04L 67/2842; H04L 47/10; H04L 67/10; H04L 67/1097; H04N 21/222; H04N 21/2343; H04N 21/2393; H04N 21/6125
USPC ........................................................ 709/201
See application file for complete search history.

(56) References Cited

U.S. PATENT DOCUMENTS 6,137,777 A    10/2000 Vaid et al.
6,466,798 B1   10/2002 Ayala et al.
(Continued)

OTHER PUBLICATIONS

Elson et al., "Internet Content Adaptation Protocol (ICAP)—RFC 3507," Apr. 2003, http://tools.ietf.org/html/rfc3507.

*Primary Examiner* — Melvin H Pollack
(74) *Attorney, Agent, or Firm* — Akerman LLP; Michael K. Dixon; Mammen (Roy) P. Zachariah, Jr.

(57) ABSTRACT

A cache server receives content and an instruction indicating an event associated with the content that causes a processor to invoke a call out to an adjunct device. The instruction further indicates an operation that the adjunct device is to perform. The cache server detects the event associated with the content, halts a flow of the content in response to detecting the event associated with the content, passes via the call out the content to the adjunct device to perform the operation, receives from the adjunct device a response and resulting data from the operation, and performs an additional operation on the resulting data based on the response from the adjunct device.

20 Claims, 6 Drawing Sheets

Related U.S. Application Data continuation of application No. 15/145,488, filed on May 3, 2016, now Pat. No. 9,787,793, which is a continuation of application No. 14/282,374, filed on May 20, 2014, now Pat. No. 9,356,996, which is a continuation of application No. 13/159,977, filed on Jun. 14, 2011, now Pat. No. 8,745,122.

(56) References Cited

U.S. PATENT DOCUMENTS

| | | | |
|---|---|---|---|
| 6,675,261 B2 | 1/2004 | Shandony | |
| 6,831,915 B1 | 12/2004 | Beyschlag et al. | |
| 6,952,712 B2 | 10/2005 | Yoshimura et al. | |
| 7,240,149 B1 | 7/2007 | Nagaraj et al. | |
| 7,385,957 B2 * | 6/2008 | O'Neill | H04L 29/06 370/338 |
| 7,593,333 B2 | 9/2009 | Li et al. | |
| 7,630,974 B2 | 12/2009 | Remahl et al. | |
| 7,720,910 B2 | 5/2010 | Goodman et al. | |
| 7,733,799 B2 * | 6/2010 | Kalliola | H04L 12/14 370/252 |
| 7,739,517 B2 | 6/2010 | Sahita et al. | |
| 7,836,179 B2 | 11/2010 | Ng et al. | |
| 8,121,874 B1 | 2/2012 | Guheen et al. | |
| 8,122,464 B2 | 2/2012 | Ramaswamy et al. | |
| 8,165,118 B2 | 4/2012 | Stewart et al. | |
| 8,166,509 B2 | 4/2012 | Brooks et al. | |
| 8,248,940 B2 | 8/2012 | Gassewitz et al. | |
| 8,296,396 B2 | 10/2012 | Farber et al. | |
| 8,307,088 B2 | 11/2012 | Leighton et al. | |
| 8,402,085 B2 | 3/2013 | McCanne et al. | |
| 8,549,150 B1 * | 10/2013 | Roseman | H04N 21/2181 370/351 |
| 8,583,820 B2 * | 11/2013 | Harrang | H04L 1/0002 709/224 |
| 8,589,993 B2 | 11/2013 | Ramaswami et al. | |
| 8,619,596 B2 | 12/2013 | Wiley et al. | |
| 8,644,675 B2 | 2/2014 | McDermott et al. | |
| 8,650,603 B2 * | 2/2014 | Doets | H04N 7/17336 725/100 |
| 8,677,505 B2 | 3/2014 | Redlich et al. | |
| 8,706,666 B2 | 4/2014 | Moss | |
| 8,717,911 B2 | 5/2014 | Bugenhagen et al. | |
| 8,737,221 B1 | 5/2014 | Jilani et al. | |
| 8,745,122 B2 | 6/2014 | Sayko et al. | |
| 8,745,260 B2 * | 6/2014 | Harrang | H04L 1/0002 709/231 |
| 8,760,496 B2 | 6/2014 | McKiel | |
| 8,792,353 B1 | 7/2014 | Janarthanan et al. | |
| 8,799,220 B2 * | 8/2014 | O'Malley | G06Q 20/20 707/627 |
| 8,813,127 B2 | 8/2014 | Liu et al. | |
| 8,874,964 B1 * | 10/2014 | Lakshminarayanan | H04N 21/42209 709/203 |
| 8,880,694 B2 * | 11/2014 | Kamei | H04L 67/06 709/225 |
| 8,898,690 B2 | 11/2014 | Dupree | |
| 8,948,013 B1 * | 2/2015 | Janarthanan | H04L 47/20 370/236 |
| 9,009,128 B2 * | 4/2015 | Goto | G06F 16/44 707/706 |
| 9,197,559 B1 * | 11/2015 | Cloonan | H04L 41/12 |
| 9,264,780 B1 * | 2/2016 | Stoica | G06F 11/0751 |
| 9,330,634 B2 | 5/2016 | Mahajan et al. | |
| 9,356,996 B2 | 5/2016 | Sayko et al. | |
| 9,639,717 B2 | 5/2017 | Moskowitz | |
| 9,712,445 B2 | 7/2017 | Morrill et al. | |
| 9,722,933 B2 | 8/2017 | Janarthanan et al. | |
| 9,742,862 B2 * | 8/2017 | Frydman | H04L 12/189 |
| 9,787,793 B2 | 10/2017 | Sayko et al. | |
| 9,929,923 B2 | 3/2018 | Heinz et al. | |
| 2002/0055351 A1 * | 5/2002 | Elsey | G06Q 10/109 455/414.2 |
| 2003/0018966 A1 | 1/2003 | Cook et al. | |
| 2003/0236974 A1 | 12/2003 | Sato et al. | |
| 2005/0089190 A1 | 4/2005 | Shavit | |
| 2006/0123053 A1 | 6/2006 | Scannell | |
| 2006/0173985 A1 | 8/2006 | Moore | |
| 2007/0156845 A1 | 7/2007 | Devanneaux et al. | |
| 2009/0282268 A1 | 11/2009 | Durham et al. | |
| 2010/0005120 A1 | 1/2010 | Kim et al. | |
| 2011/0106928 A1 | 5/2011 | Gokurakuji et al. | |
| 2011/0246557 A1 | 10/2011 | Enomoto | |
| 2011/0258257 A1 | 10/2011 | Previdi | |
| 2012/0046927 A1 | 2/2012 | Nettleton et al. | |
| 2012/0066360 A1 | 3/2012 | Ghosh | |
| 2012/0072912 A1 | 3/2012 | Fulkerson et al. | |
| 2012/0094768 A1 | 4/2012 | McCaddon et al. | |
| 2012/0166591 A1 | 6/2012 | Eggleston et al. | |
| 2012/0254343 A1 | 10/2012 | Harvell et al. | |
| 2012/0278841 A1 | 11/2012 | Hasek et al. | |
| 2012/0311177 A1 | 12/2012 | Visharam et al. | |
| 2015/0135214 A1 | 5/2015 | Reisman | |
| 2017/0238025 A1 | 8/2017 | Riedl et al. | |
| 2017/0325006 A1 | 11/2017 | Marcus | |
| 2018/0054640 A1 | 2/2018 | Dupree | |

\* cited by examiner

-1FIG. 3

SYSTEM AND METHOD FOR PROVIDING AN ADJUNCT DEVICE IN A CONTENT DISTRIBUTION NETWORK

CROSS-REFERENCES TO RELATED APPLICATIONS

This application is a continuation of U.S. patent application Ser. No. 15/724,964, filed Oct. 4, 2017, which is a continuation of U.S. patent application Ser. No. 15/145,488, filed May 3, 2016, now U.S. Pat. No. 9,787,793, which is a continuation of U.S. patent application Ser. No. 14/282,374, filed May 20, 2014, now U.S. Pat. No. 9,356,996, which is a continuation of and claims priority to U.S. patent application Ser. No. 13/159,977, filed Jun. 14, 2011, now U.S. Pat. No. 8,745,122. The contents of each of which are hereby incorporated by reference in their entireties.

FIELD OF THE DISCLOSURE

The present disclosure generally relates to communications networks, and more particularly relates to content distribution networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
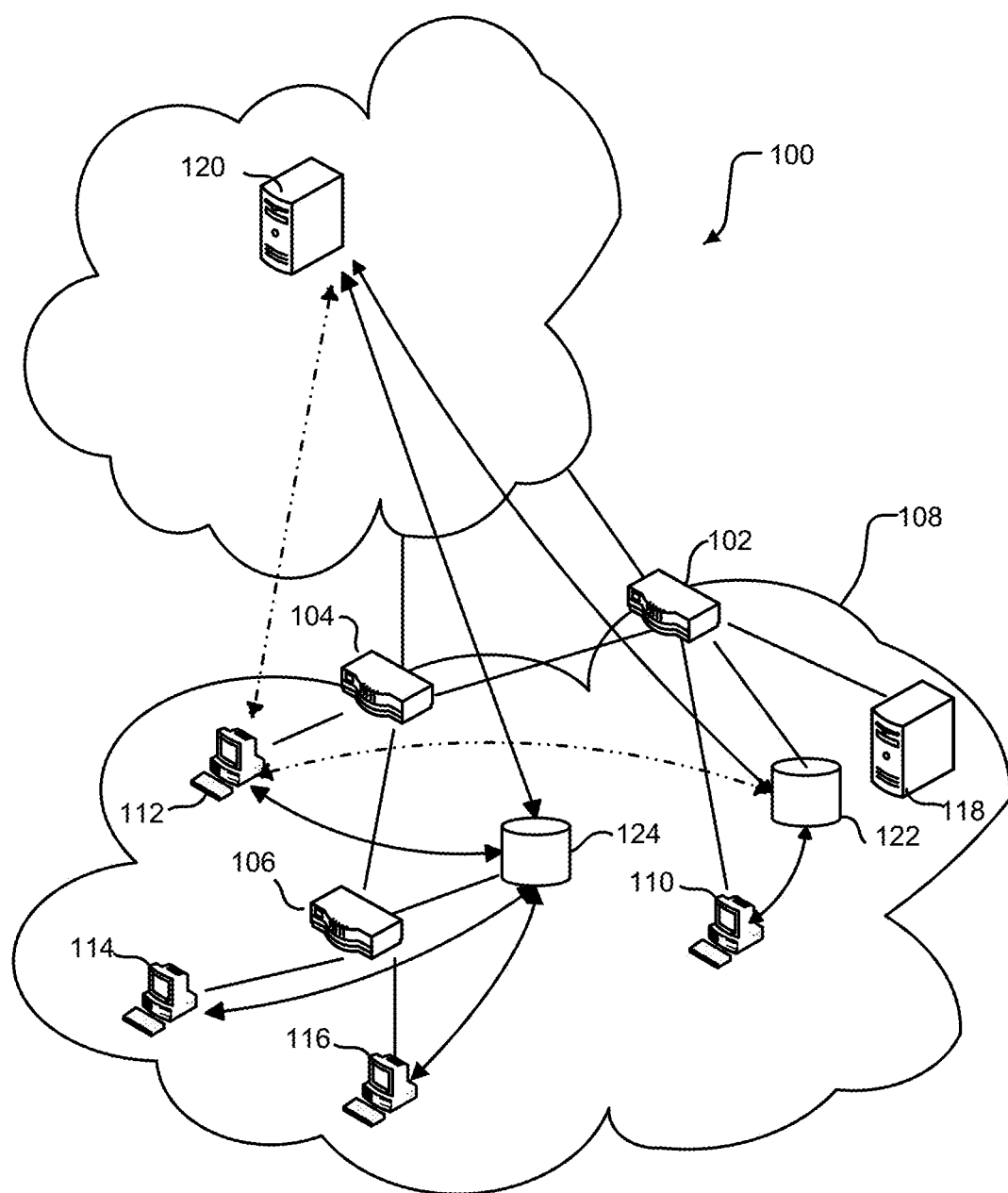
FIG. 1 is a block diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other as—that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106.

Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, a lowest load, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
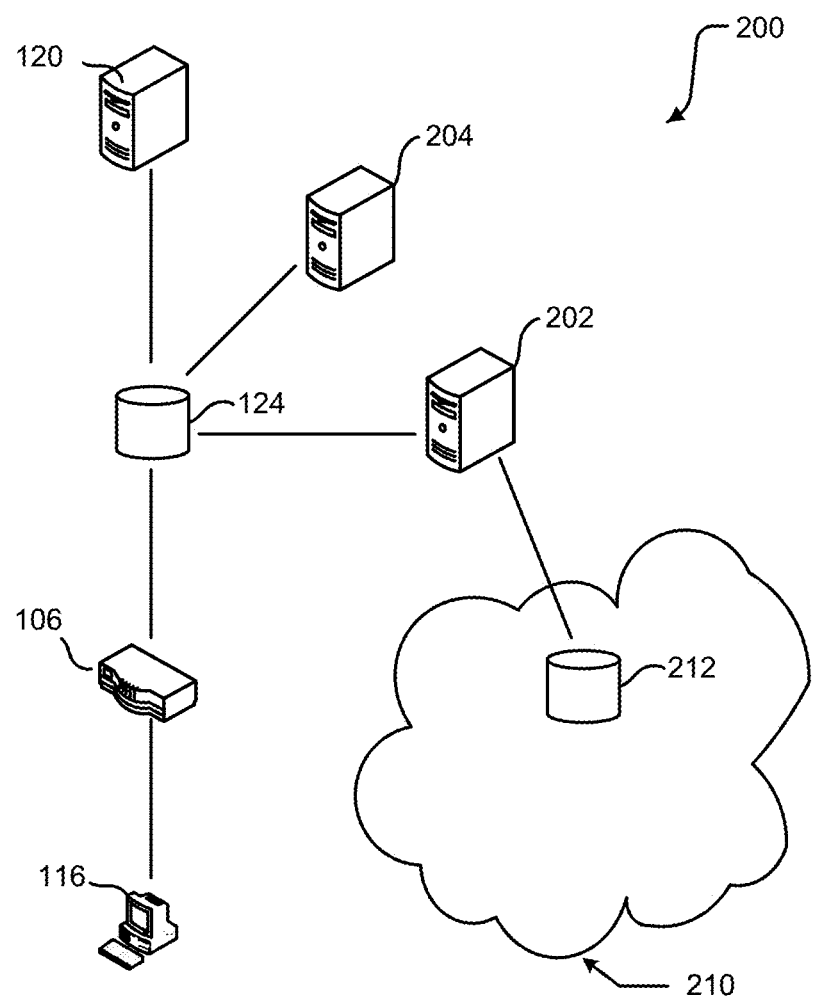
FIG. 2 is a block diagram illustrating a content distribution network to be used in conjunction with the communications network.

FIG. 2 illustrates a content distribution network (CDN) 200 that can be used in conjunction with communications network 100. The CDN 200 includes adjunct servers 202 and 204, the router 106, the client device 116, the server 120, and the cache server 124. The cache server 124 is in communication with the adjunct server 202, with the adjunct server 204, with the server 120, and with the router 106, which in turn is in communication with the client device 116. The server 120 can provide content to the client device 116 via the cache server 124 and the router 106.

The cache server 124 can provide different core features for handling and processing the content in the CDN 200, such as caching the content, distributing the content, and the like. In an embodiment, the cache server 124 can also be a streaming server or the like. The adjunct servers 202 and 204 can provide additional features that are not provided by the cache server 124, such as compressing the content, rewriting a hypertext transfer protocol (HTTP) header, transcoding video content, calculating a time-to-live (TTL) period for the content in the cache server, authenticating the client device 116 to receive the content, and the like. The additional features provided by the adjunct servers 202 and 204 may be features that are not often utilized in the CDN 200, or may require a high processor utilization in a server. Thus, the additional features can be specialized features that may need hardware and/or software to be executed that may not be installed in the cache server 124 or other core devices in the CDN 200.

In an embodiment, there can be more adjunct servers than shown in FIG. 2, and each of the adjunct servers can perform a different specialized function or operation. Each of the adjunct servers can have an Internet Protocol (IP) address assigned, and each of the adjunct servers can advertise its IP addresses via Border Gateway Protocol (BGP). The cache server 124 can utilize the IP addresses to identify the appropriate adjunct server to which to send an application programming interface (API) call out. The content can be standardized when it is passed between the cache server 124 and the adjunct servers 202 and 204, such that a wide variety of offloading operations can be supported in the CDN 200.

Each of the adjunct servers 202 and 204 can include an adjunct processor or set of processors that may support a single instance or multiple instances of the cache server 124. The adjunct servers 202 and 204 may be in a hierarchical relationship, such that adjunct server 204 can include additional functionality that the adjunct server 202 does not have. The additional functionality may enable the adjunct server 204 to perform operations that are more specialized and/or that require more processing ability than the operations that can be performed by the adjunct server 202. The cache server 124 can communicate with the adjunct servers 202 and 204 via HTTP representational state transfer (REST) interface, or any suitable alternative protocol. For example, the HTTP REST interface can enable the cache server 124 to send a request to the adjunct server 202 and 204, and can enable the adjunct servers to return a response to the cache server. In an embodiment, the adjunct servers 202 and 204 may be proprietary or managed adjunct servers, such that the cache server 124 may need to provide authentication information to communicate with the adjunct servers.

The cache server 124 can communicate with the other devices in the CDN 200 via a data channel, a provisioning channel, and the like. The cache server 124 can utilize the data channel to route content data, from the server 120 to the client device 116, from the client device to the server, to or from other servers within the CDN 200, and the like. The cache server 124 can receive, via the provisioning channel, an instruction indicating events in the data channel of the cache server that can trigger an API call out to the adjunct server 202 or 204. The instruction can also indicate where in a flow of data the call out should occur, an operation that the adjunct server 202 or 204 should invoke on behalf of the cache server 124, and the like.

During operation, the cache server 124 can cache content received from the server 120, and can distribute the content to the client device 116 via the data channel. The cache server 124 may have previously received instructions, via the provisioning channel, indicating that the adjunct server 202 or 204 should be invoked to perform different operations when the content data is cached. The operations can be calculating the TTL period for the content cached in the cache server 124, transcoding video content, and the like.

When the cache server 124 caches the content, the cache server can halt the flow of data in the cache server, can invoke the adjunct server 202 or 204 to perform an operation, and can send the content data to the adjunct server. The cache server 124 can utilize an embedded API to call out the adjunct server 202 or 204 to perform one or more operations. For example, the cache server 124 can send an API call out to the adjunct server 202 requesting that the adjunct server calculate a TTL period for specific content cached in the cache server.

The adjunct server 202 can receive the API call out and the content from the cache server 124 via the HTTP REST interface. The adjunct server 202 can then use functionality embedded in the adjunct server to calculate the TTL period for the cached content. The functionality can include software applications, processors, and other hardware needed to perform the operation. When the adjunct server 202 has calculated the TTL period, the adjunct server can send a reply to the cache server 124 via the HTTP REST interface. The reply can include data resulting from the operation, such as the calculated TTL period for the cached content.

When the cache server 124 receives the reply from the adjunct server 202, the cache server can determine that another operation, such as transcoding video content, needs to be performed. The cache server 124 can then determine whether the adjunct server 204 has the functionality to perform the transcoding operation. If the adjunct server 204 does have the functionality, the cache server 124 can send an API call to the adjunct server to perform the transcoding operation. The adjunct server 204 can then perform the transcoding operation included in the API call from cache server 124, and can send a reply including data resulting from the transcoding operation to the cache server 124 via the HTTP REST interface.

The cache server 124 can use the replies from the adjunct server 202 and from the adjunct server 204 to carry out an additional set of actions for the content data, such as caching the transcoded video content in a memory of the cache server. The cache server 124 can then resume the flow of content data in the CDN 200. The additional set of actions can be easily implemented, such that they can be carried out by any type cache server in the CDN 200.

In another embodiment, the adjunct servers 202 and 204 can be a cloud-based adjunct server, such that both of the adjunct servers are located in a single remote server. The cloud-based adjunct server can include one or more processors, hardware, software, and the like to perform any of the specialized features that may be needed in the CDN 200. That is, the remote server can receive an API call out from one or more cache servers in the CDN 200, and can perform a desired operation on the content. The cloud-based adjunct server may have enough functionality to be able to perform multiple operations invoked by different cache servers at the same time. The cloud-based server can be allocated more resources when new operations should be performed by the cloud-based server, such that only one server has to be updated with more resources.

In another embodiment, the CDN 200 can be joined together with CDN 210 to be able to provide caching and distribution of larger amounts of content. In this situation, a cache server 212 of CDN 210 may not be able to perform a specialized operation, and CDN 210 may not have an adjunct server capable of performing the specialized operation. The cache server 212 may discover through BGP that adjunct server 202 can perform the specialized operation.

The cache server 212 can then send an API call out to the adjunct server 202 of CDN 200 to invoke the adjunct server to perform the specialized operation on content. Thus, the CDNs 200 and 210 may include adjunct servers that support API call outs from devices in other CDNs, such that each CDN does need adjunct servers that can perform every possible operation that may be needed in that CDN.

Figure 3:
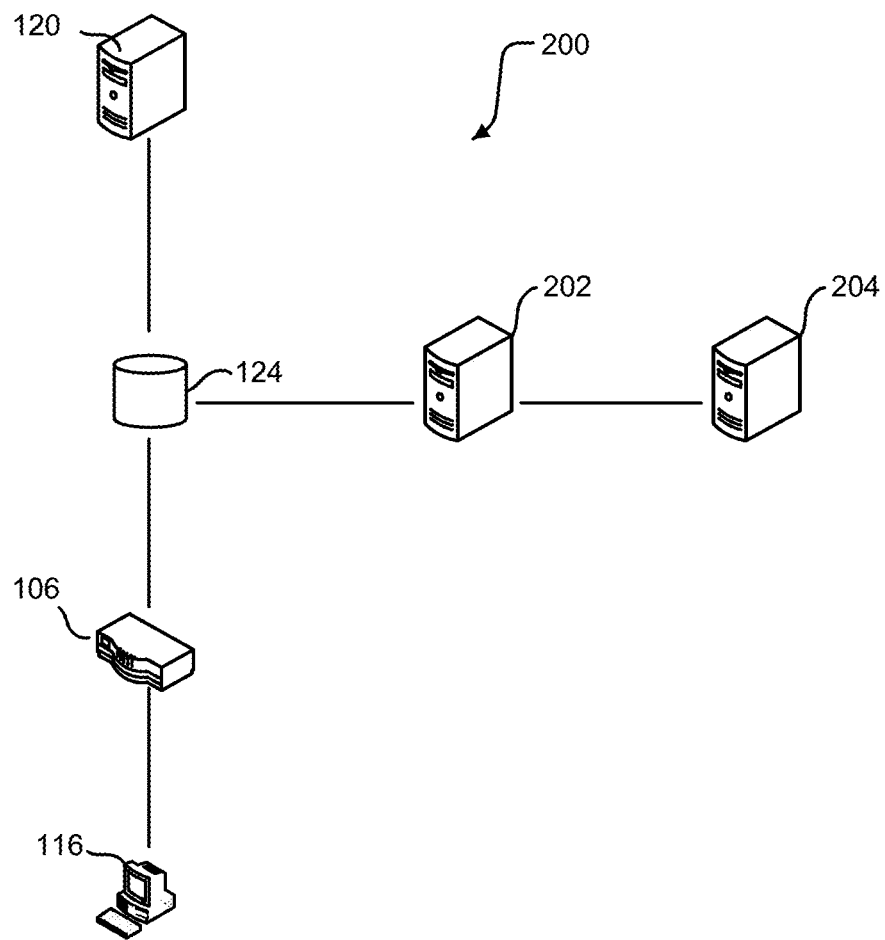
FIG. 3 is a block diagram illustrating another embodiment of the content distribution network.

FIG. 3 illustrates another embodiment of the CDN 200. The CDN 200 includes adjunct servers 202 and 204, the router 106, the client device 116, the server 120, and the cache server 124. In this embodiment, the cache server 124 is in communication with the adjunct server 202, which in turn is in communication with the adjunct server 204. The router 106, server 120, client device 116, and adjunct servers 202 and 204 can communicate as described above in FIGS. 1 and 2. The cache server 124 can provide the core features for handling and processing the content in the CDN 200 as described above in FIG. 2. Similarly, the adjunct servers 126 and 128 can provide additional features that are not provided by the cache server 124 as described above in FIG. 2.

During operation, the cache server 124 can cache content received from the server 120, and can distribute the content to the client device 116 via the data channel. The cache server 124 may have previously received instructions, via the provisioning channel, indicating that the adjunct server 202 or 204 should be invoked to perform different operations. The operations can be calculating the TTL period for the content cached in the cache server 124, transcoding video content, and the like. The instruction can also indicate that the adjunct servers 202 and 204 should be invoked when the content is cached in the cache server 124. When the cache server 124 caches the content, the cache server can halt the flow of data in the cache server, can invoke the adjunct server 202 to perform the one or more of the operations, and can send the content data to the adjunct server. The cache server 124 can utilize the API to call out the adjunct server 202 to perform the one or more operations.

The adjunct server 202 can receive the API call out and the content from the cache server 124 via the HTTP REST interface. The adjunct server 202 can then use functionality embedded in the adjunct server to perform one of the operations, such as calculating the TTL period for the cached content. When the adjunct server 202 has completed calculating the TTL period, the adjunct server can determine whether the API call includes another operation to be performed. If the API call does not include another operation to be performed, the adjunct server 202 can send a reply to the cache server 124 via the HTTP REST interface. The reply can include data resulting from the operation, such as the calculated TTL period for the cached content. However, if the API call does include another operation to be performed, such as transcoding the video content, the adjunct server 202 can determine whether the adjunct server has the functionality to perform the operation.

If the adjunct server 202 has the functionality to perform the transcoding operation, the adjunct server can perform the transcoding operation. However, if the adjunct server 202 does not have the functionality, the adjunct server can send an API call out to the adjunct server 204, which does have the necessary functionality. In this situation, the adjunct servers 202 and 204 can be in a hierarchical relationship, such that adjunct server 204 can include additional functionality and the adjunct server 202 can pass operation to the adjunct server 204. The adjunct server 204 can then perform the transcoding operation included in the API call from the adjunct server 202. The adjunct server 204 can send a reply including data resulting from the transcoding operation to the adjunct server 202, which in turn can provide the replies associated with both of the operations to the cache server 124 via the HTTP REST interface.

Figure 4:
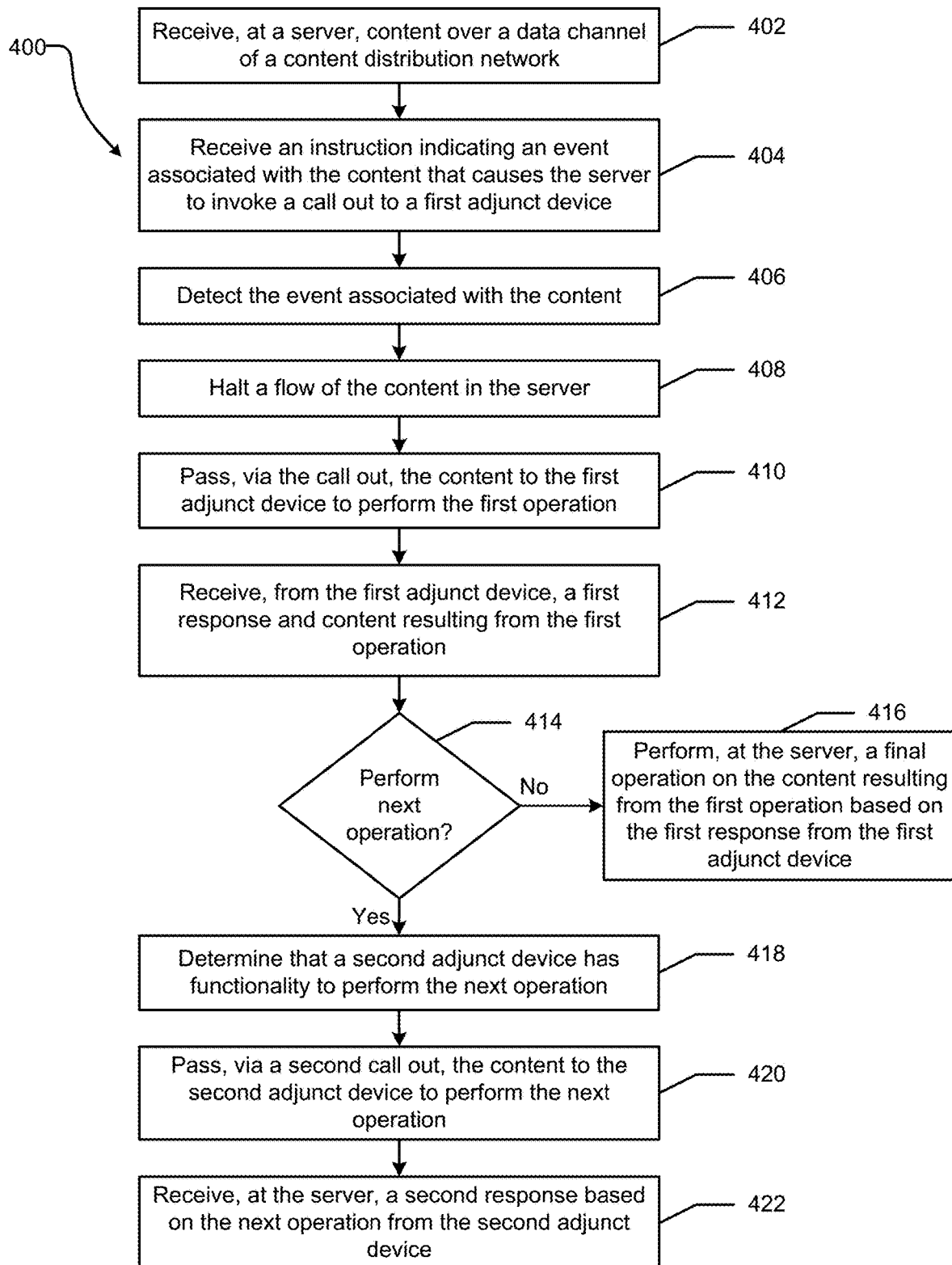
FIG. 4 is a flow diagram illustrating a method for offloading operations from a server of the content distribution network.

FIG. 4 illustrates a method 400 for offloading operations from a server of the content distribution network 200. At block 402, content is received at a server over a data channel of a content distribution network. The server can provide the content between a client device and a content source device in the content distribution network. An instruction indicating an event associated with the content that causes the server to invoke a call out to a first adjunct device is received at the server at block 404. The instruction can be received via a provisioning channel of the server. The instruction can further indicate a first operation that the first adjunct device is to perform. The first operation for the content can be compressing content, rewriting a hypertext transfer protocol header, transcoding video, calculating a time-to-live period, authenticating a client device, and the like.

At block 406, the event associated with the content is detected at the server. A flow of the content is halted in the server at block 408. At block 410, the content is passed, via the call out, to the adjunct device to perform the operation. A first response and content resulting from the first operation is received from the first adjunct device at block 412. At block 414, a determination is made whether a next operation needs to be performed. If the next operation does not need to be performed, a final operation is performed on the content resulting from the operation performed at the server based on the response from the first adjunct device at block 416.

If the next operation needs to be performed, a second adjunct device is determined to have functionality to perform the next operation at block 418. At block 420, the content is passed to the second adjunct device via a second call out. A second response based on the next operation is received at the server from the second adjunct device at block 422. In an embodiment, the first adjunct device has more functionality than the server, and the second adjunct device has more functionality than the first adjunct device. In another embodiment, the first adjunct device and the second adjunct device form a hierarchical relationship in the content distribution network. The first adjunct device and the second adjunct device can be servers in the content distribution network.

Figure 5:
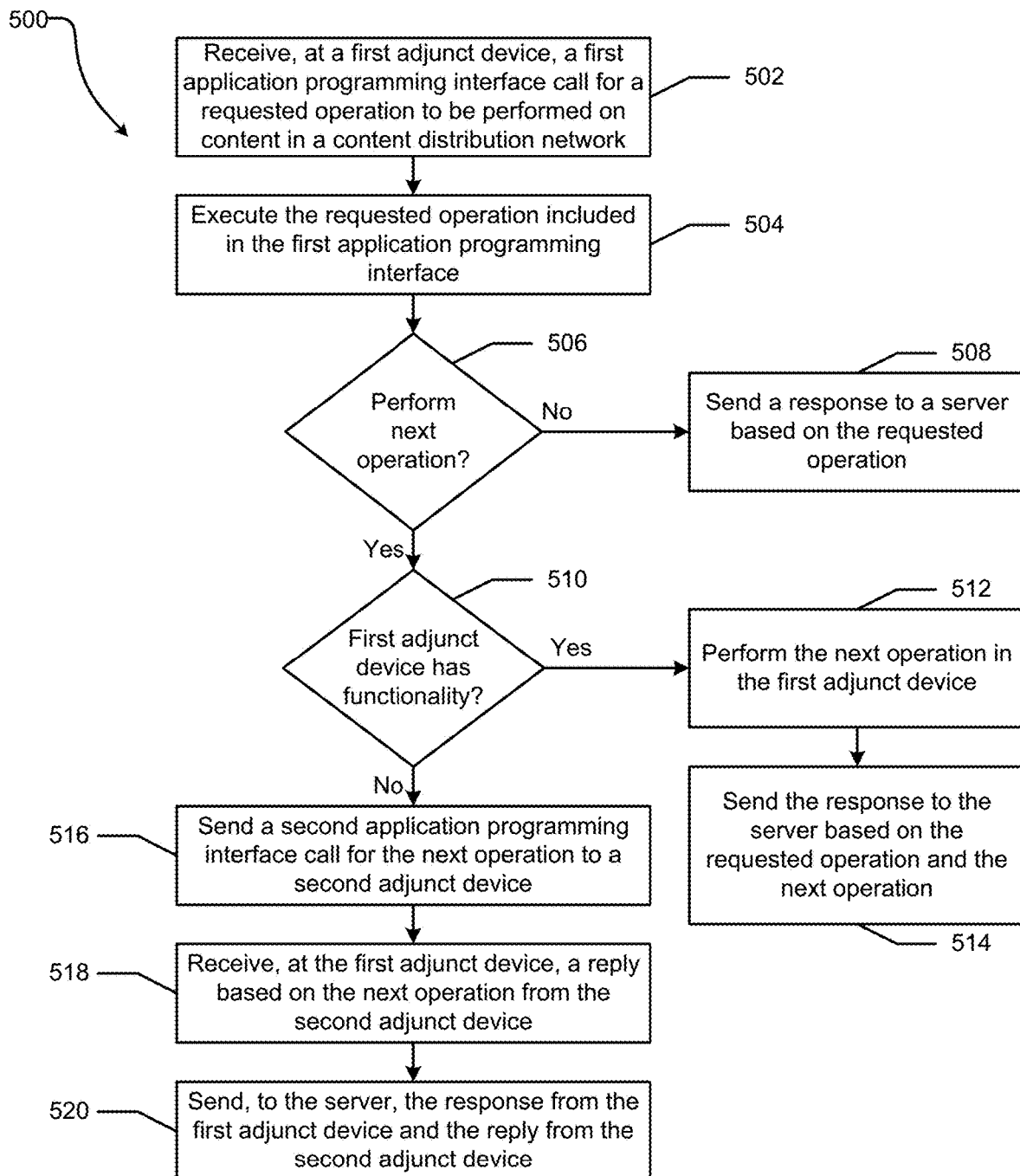
FIG. 5 is a flow diagram illustrating a method for performing operations in an adjunct device of the content distribution network.

FIG. 5 illustrates a method 500 for performing an operation in an adjunct server of the content distribution network 200. At block 502, a first application programming interface call for a requested operation to be performed on content in a content distribution network is received at a first adjunct device. The requested operation for the content includes compressing content, rewriting a hypertext transfer protocol header, transcoding video, calculating a time-to-live period, authenticating a client device, and the like. The requested operation included in the first application programming interface call is executed at block 504. At block 506, a determination is made whether a next operation needs to be performed. The next operation for the content includes compressing content, rewriting a hypertext transfer protocol header, transcoding video, calculating a time-to-live period, authenticating a client device, and the like. If the next operation does not need to be performed, a response based on the operation is sent from the first adjunct device to a server at block 508.

If the next operation does need to be performed, a determination is made whether the first adjunct device has a functionality to perform the next operation at block 510. If the first adjunct device has the functionality, the next operation is performed in the first adjunct device at block 512. At block 514, the response is sent to the server based on the requested operation and the next operation performed by the first adjunct device. If the first adjunct device does not have the functionality, a second application programming interface call for the next operation is sent from the first adjunct device to a second adjunct device at block 516. At block 518, a reply based on the next operation is received from the second adjunct device. The response from the first adjunct device and the reply from the second adjunct device are sent to the server at block 520.

In an embodiment, the first adjunct device has more functionality than the server, and the second adjunct device has more functionality than the first adjunct device. In another embodiment, the first adjunct device and the second adjunct device form a hierarchical relationship for the requested operation and the next operation in the content distribution network. The first adjunct device and the second adjunct device can be servers in the content distribution network.

Figure 6:
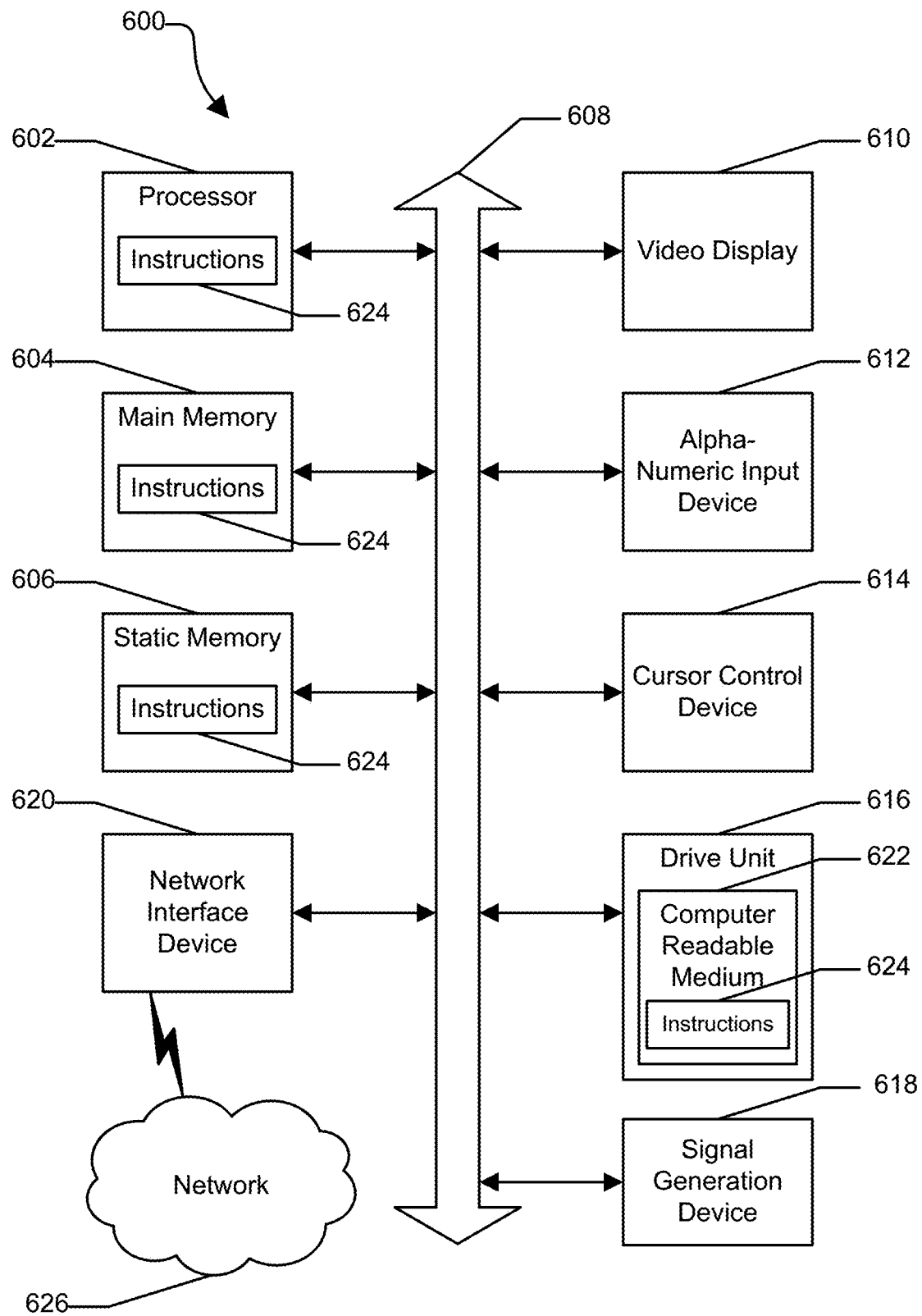
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid state display, or a cathode ray tube (CRT). Additionally, the computer system 600 may include an input device 612 such as a keyboard, and a cursor control device 614 such as a mouse. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. The computer-readable medium can be a non-transitory computer readable medium, such as a hard disk drive, a flash memory, a read-only memory, a compact disk, a digital versatile disk, a cache, a random-access memory, and the like. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device, comprising:
    a memory that stores instructions;
    a processor that executes the instructions to perform operations, the operations comprising:
        detecting an event associated with content; and
        providing, via a call out indicated by the event associated with the content, the content to a first adjunct device so that the first adjunct device performs an action at a position in a flow of the content where the flow of the content has been halted.

2. The device of claim 1, wherein the operations further comprise receiving the content over a data channel of a content distribution network.

3. The device of claim 1, wherein the operations further comprise receiving an instruction to invoke the call out.

4. The device of claim 1, wherein the operations further comprise receiving an instruction indicating the action that the first adjunct device is to perform.

5. The device of claim 1, wherein the action comprises compressing the content, rewriting a header, transcoding video content of the content, calculating a time-to-live period, authenticating a client device, or a combination thereof.

6. The device of claim 1, wherein the operations further comprise halting the flow of the content at the position upon detecting the event.

7. The device of claim 1, wherein the operations further comprise receiving a response resulting from performance of the action.

8. The device of claim 7, wherein the operations further comprise determining whether a next action needs to be performed based on the response.

9. The device of claim 8, wherein the operations further comprise determining a second adjunct device to perform the next action.

10. The device of claim 9, wherein the operations further comprise passing the content to the second adjunct device via a different call out.

11. The device of claim 10, wherein the operations further comprise forming a hierarchical relationship between the first adjunct device and the second adjunct device in a network.

12. The device of claim 1, wherein the operations further comprise determining whether the first adjunct device has functionality for performing a next action on the content.

13. The device of claim 12, wherein the operations further comprise causing the first adjunct device to perform the next action if the first adjunct device has the functionality.

14. A method, comprising:
    detecting, by utilizing instructions from a memory that are executed by a processor, an event associated with content; and
    transmitting, via a call out indicated by the event associated with the content, the content to a first adjunct device so that the first adjunct device performs an action at a position in a flow of the content where the flow of the content has been halted.

15. The method of claim 14, further comprising determining whether the first adjunct device has functionality for performing a next action on the content.

16. The method of claim 15, further comprising causing a second adjunct device to perform the next action if the first adjunct device does not have the functionality.

17. The method of claim 14, further comprising receiving an application programming interface call for the action to be performed on the content.

18. The method of claim 14, further comprising halting the flow of the content at the position upon detecting the event.

19. The method of claim 14, further comprising receiving an instruction to invoke the call out.

20. A computer-readable device comprising instructions, which, when loaded and executed by a processor, cause the processor to perform operations, the operations comprising:
    detecting an event associated with content; and
    providing, via a call out indicated by the event associated with the content, the content to a first adjunct device so that the first adjunct device performs an action at a position in a flow of the content where the flow of the content has been halted.

\* \* \* \* \*